S. J. FLETCHER.
BEDSTEAD KNOB.
APPLICATION FILED MAR. 11, 1913.
1,081,105.
Patented Dec. 9, 1913.
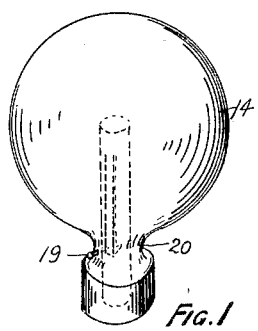
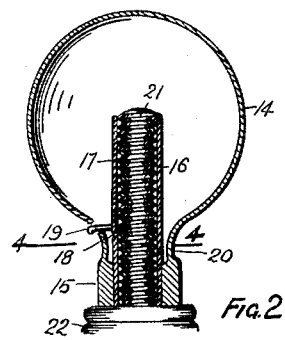
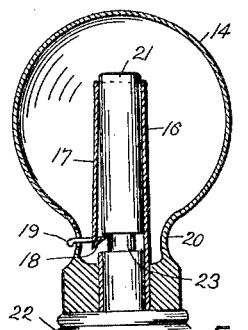
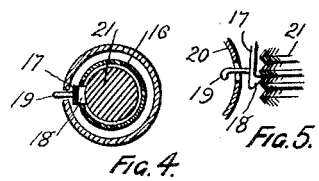
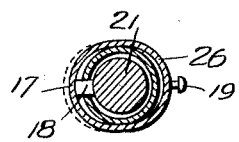
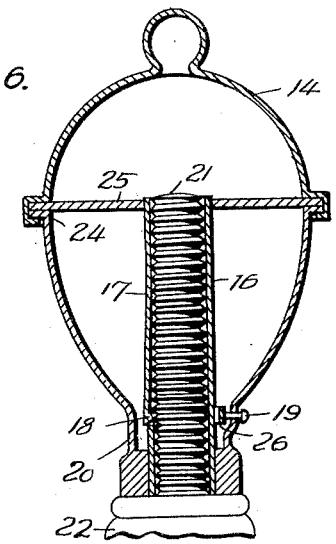
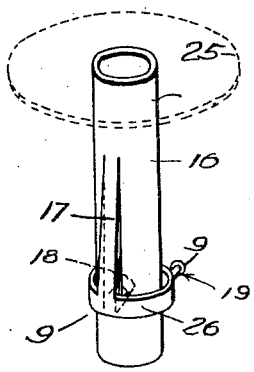
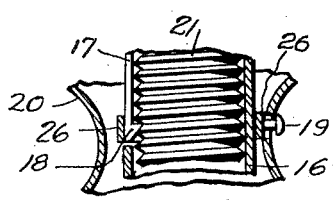
WITNESSES
W. C. Baker
A. L. Kitchin
INVENTOR
Samuel James Fletcher
BY Munn & Co
ATTORNEYS

UNITED STATES PATENT OFFICE.

SAMUEL JAMES FLETCHER, OF ASHFIELD, NEW SOUTH WALES, AUSTRALIA.

BEDSTEAD-KNOB.

1,081,105.  Specification of Letters Patent. Patented Dec. 9, 1913.

Application filed March 11, 1913. Serial No. 753,492.

*To all whom it may concern:*

Be it known that I, SAMUEL JAMES FLETCHER, a subject of the King of Great Britain and Ireland, residing in Shepherd street, Ashfield, in the State of New South Wales, Commonwealth of Australia, have invented certain new and useful Improvements in Bedstead-Knobs, of which the following is a specification.

This invention relates to the ornamental knobs surmounting the posts of bedsteads, in which as hitherto constructed a threaded nut is provided in the base, designed and adapted to be screwed upon a threaded stud or "laying-in" screw projecting from the post, and though this construction and mode of affixing the knob are efficient for a limited period frequent removal soon wears the thread of the nut (which is usually of comparatively soft metal) with the result that the knob becomes loose, will not remain upright and consequently presents an unsightly appearance; also support being at the base only, a comparatively light blow or pressure tends to produce deflection from the vertical. Furthermore the screwed stud being usually of considerably greater length than the nut, the screwing of the knob on or off is a tedious task.

The object of the present invention is to effect certain improvements in bedstead knobs whereby the latter are supported more firmly, the provision of the screwed nut in the knob is obviated and the adjustment or removal of the knob may be more quickly effected.

According to this invention the knob is provided internally with a tubular guide designed and adapted to fit upon the stud projecting from the bed post, and having a spring detent adapted to engage the threads of a screwed stud or in an annulus provided on a stud, the said tubular guide being affixed at its lower end in the base of the knob which is secured in the same manner as the before mentioned threaded nut or by other suitable means, and preferably having its upper end supported by a horizontal diaphragm plate, and the said spring detent being releasable by means of a finger piece projecting through the neck of the knob.

Referring now to the accompanying drawings which illustrate bedstead knobs constructed in accordance with this invention, and in which:—

Figure 1 is an external perspective view of a knob constructed according to this invention, the internal tubular guide being shown in dotted lines. Figs. 2 and 3 are vertical sections of a knob showing respectively the engagement of the spring detent with the thread of a screwed stud and with an annulus or an otherwise plain stud. Fig. 4 is a section on line 4. 4. of Fig. 2. Fig. 5 is a detail on an enlarged scale showing the engagement of the detent with the threaded stud, and the releasing pull-out finger piece. Fig. 6 is a vertical section of a knob made in two pieces with tubular guide supported by a diaphragm plate, and showing a modification of the arrangement of the releasing finger piece. Fig. 7 illustrates a tubular guide and the modification in the arrangement of the finger piece. Fig. 8 is a horizontal section through the construction shown in Fig. 6 and Fig. 9 is an enlarged detail showing the modification referred to.

Referring to Figs. 1 to 6 inclusive:—The knob 14 has a solid base 15 secured in the known manner and in which is affixed the lower end of the tubular guide 16. The latter has two longitudinal and parallel incisions connected at their lower ends by a circumferential incision, the part between the incisions forming a spring 17 on the lower end of which and internally thereof is the detent 18, and externally of the lower end of the said spring is the finger piece 19 projecting through the neck 20 of the knob 14. The tubular guide 16 is designed and adapted to fit upon the stud 21 affixed in the top of the bed post 22, and the said stud may be of ordinary screw threaded type as shown in Figs. 2 and 5, or of plain type having an annulus 23 as shown in Fig. 3. In the former case the detent 18 inwardly pressed by the spring 17 takes into the thread of the stud and in the latter case into the annulus 23. By pulling out the finger piece 19 the detent is drawn clear of the stud and the knob will then slide freely thereon for adjustment or removal.

Referring to Figs. 6 to 9 inclusive in which the same reference numerals are used to indicate the parts hereinbefore mentioned:—The knob 14 is constructed in two parts joined together in known manner as indicated in the drawing at 24, and the edge of a circular diaphragm plate 25 is fitted in the joint before closure by spinning or other means. The said diaphragm plate has a central aperture which engages the upper end of the tubular guide 16, the rigidity of the knob and resistance to crushing being thereby greatly increased. The modification in the arrangement of the finger piece 19 consists in causing it to project from the neck of the knob at the opposite side to the spring 17 it being attached to a ring 26 encircling the tubular guide 16 and attached to the said spring at a point diametrically opposite to the said finger-piece. By this construction inward pressure of the finger-piece releases the detent 18.

What I claim and desire to secure by Letters Patent is:—

1. A bedstead attachment comprising a stud for projecting from a bed post, a tubular guide for engaging said stud, a knob secured to said tubular guide, a spring detent carried by said tubular guide for engaging said stud in order to hold said tubular guide upon said stud, and a finger piece mounted upon said spring detent and extending externally of said knob to enable said spring detent to be disengaged from said stud.

2. In a device of the character described, the combination of a supporting stud, a tubular guide for encircling said stud, a knob fitted upon said tubular guide, a detent carried by said guide for gripping said stud in order to hold said guide upon said stud, and a finger piece connected with said detent and extending through the wall of said knob for the purpose of enabling the pressure upon said finger piece to disengage said detent from said stud.

In testimony whereof I affix my signature in presence of two witnesses.

SAMUEL JAMES FLETCHER.

Witnesses:
CHAS. HATTON,
WM. NEWTON.

Copies of this patent may be obtained for five cents each, by addressing the "Commissioner of Patents. Washington, D. C."